Dec. 10, 1935.  E. W. KRONBACH  2,024,130
LIQUID FILLING AND MEASURING APPARATUS
Filed Jan. 4, 1934  3 Sheets-Sheet 2

INVENTOR
*Edwin W. Kronbach*
BY *Richard J. Kembling*
ATTORNEY

Dec. 10, 1935.   E. W. KRONBACH   2,024,130
LIQUID FILLING AND MEASURING APPARATUS
Filed Jan. 4, 1934   3 Sheets-Sheet 3
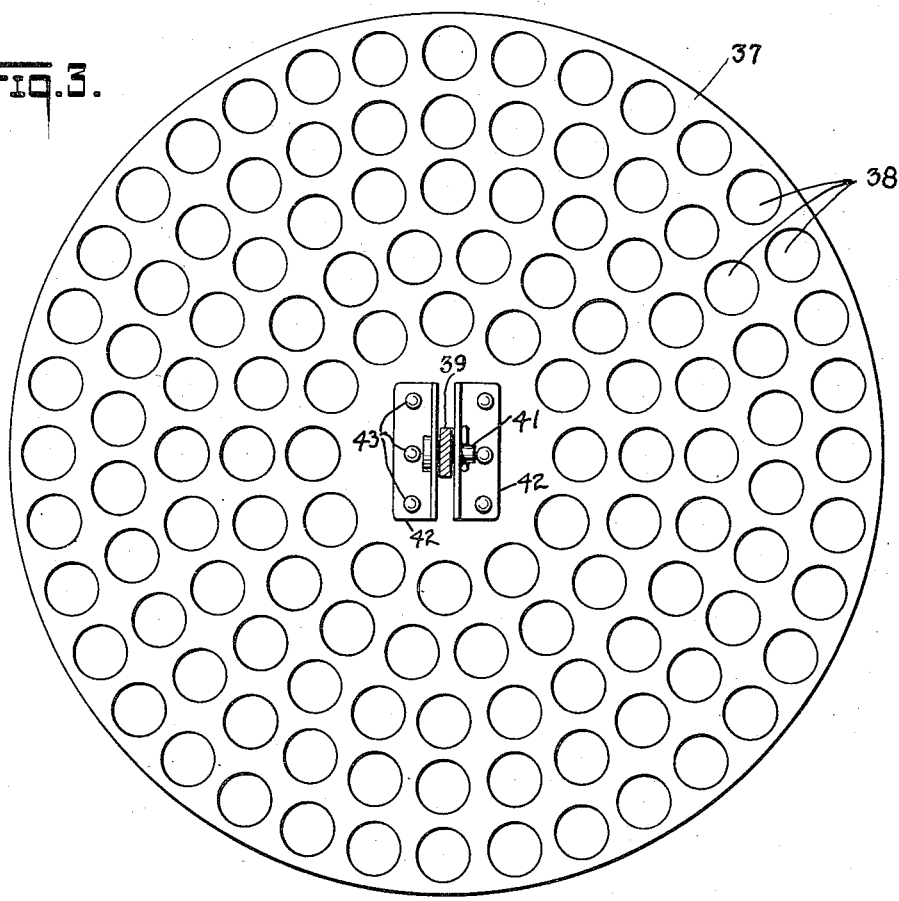
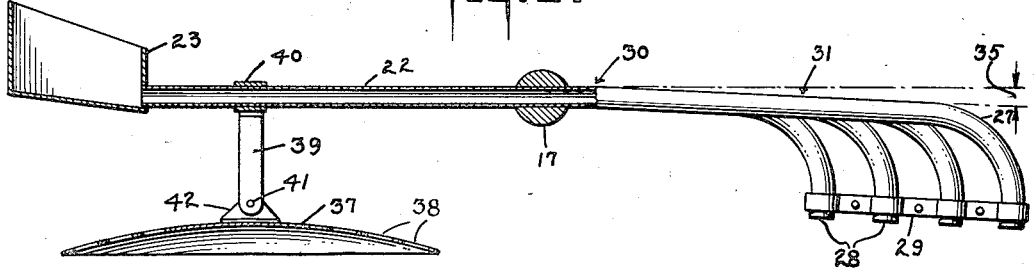
INVENTOR
*Edwin W. Kronbach*
BY
ATTORNEY Patented Dec. 10, 1935

2,024,130

UNITED STATES PATENT OFFICE 2,024,130

LIQUID FILLING AND MEASURING APPARATUS

Edwin W. Kronbach, Cleveland Heights, Ohio, assignor to Popsicle Service, Incorporated, Brooklyn, N. Y., a corporation of Illinois Application January 4, 1934, Serial No. 705,175

15 Claims. (Cl. 226—104)

The present invention relates to liquid filling and measuring apparatus, and it has particular relation to a filling and measuring apparatus adapted to simultaneously deliver accurately measured quantities of liquid from a supply tank to a plurality of receptacles spaced at varying distances therefrom.

My invention is directed to improvements in the apparatus disclosed and claimed in the co-pending application of Milton Schnaier, Serial Number 527,967, filed April 6, 1931, which has matured into Letters Patent No. 1,955,441, issued April 17, 1934. In liquid filling and measuring apparatus of this character, which is totally devoid of valve mechanism, the accuracy of the measured quantities of liquid delivered to a plurality of receptacles depends generally upon the liquid level in the dipper being in a true horizontal plane, uniform cross-sectional area of delivery tubes and arrangement of the tubes in a horizontal plane at the dipper. It has been found, however, that in such apparatus, where the delivery tubes are adapted to discharge liquid in receptacles spaced at varying distance from the supply tank, the lengths of the tubes have a bearing on the quantities of liquid being delivered, and that, if the tubes are in the same horizontal plane throughout their lengths, the longer tubes will deliver a slightly greater quantity of liquid than the shorter tubes.

An object of the present invention is to insure accurately measured quantities of liquid being supplied to all receptacles notwithstanding the fact that they are positioned at varying distances from the supply tank.

A further object of the present invention is the provision of simple and inexpensive means for agitating the liquid in the supply tank, thereby maintaining the solid matter in the liquid, such as flavoring, sugar, etc., in suspension at all times during operation of the apparatus.

In accordance with a preferred embodiment of the invention, a supply tank is provided with means for automatically maintaining a substantial quantity of liquid therein. Mounted on the supply tank above the liquid level is a tiltable or rockable structure, having a plurality of tubes of varying lengths mounted thereon intermediate their ends, and also having means suspended therefrom adapted to agitate the liquid in the tank when the structure is being operated. The tubes mounted on the tilting structure have their receiving ends rigidly connected in communicating relation with a dipper adapted to be submerged and withdrawn from the liquid in the tank. The opposite ends of said tubes are bent downwardly to provide vertical delivery spouts adapted to extend partially into the receptacles to be filled with the liquid. The discharging ends of said tubes, which comprise that portion of the tubes extending beyond the tilting axis and which are of varying lengths, are declined from a common point along a transverse axis, thereby causing simultaneous discharge of any liquid flowing through said tubes prior to the time they are raised or tilted to their full discharging position. Since the tubes are of varying length, it is necessary to provide a common point of declination, which will cause gravitational discharge of any liquid flowing in the longer tubes simultaneously with the discharge of such liquid flowing in the shorter tubes, thereby preventing a greater head of liquid forming in the longer tubes due to pressure of the liquid in the dipper while the tubes are being raised and approaching their discharging position.

It will be apparent that the apparatus is capable of feeding a plurality of receptacles disposed at varying distances from the tank. With this end in view, the tubes for conveying the liquid to the receptacles are of different lengths. Since the receptacles are generally disposed or fed under the machine in parallel rows, the discharging ends of the tubes are disposed obliquely to the receiving ends so that the delivery spouts of each group of tubes are arranged one in advance of the other and in rows corresponding to the rows of receptacles to be filled.

Other and further objects and advantages of the invention will be apparent from the following description, wherein a preferred form of embodiment is shown, reference being had to the accompanying drawings forming a part thereof, in which:

Fig. 3 is an enlarged plan view of the agitating disc shown in Fig. 1, the same being taken substantially along the line 3—3 thereof; and Fig. 4 is an enlarged view, partially in section, of the delivery tubes, illustrating in an accentuated manner the declination of the discharging ends thereof at a common point along a transverse axis.

Figure 1:
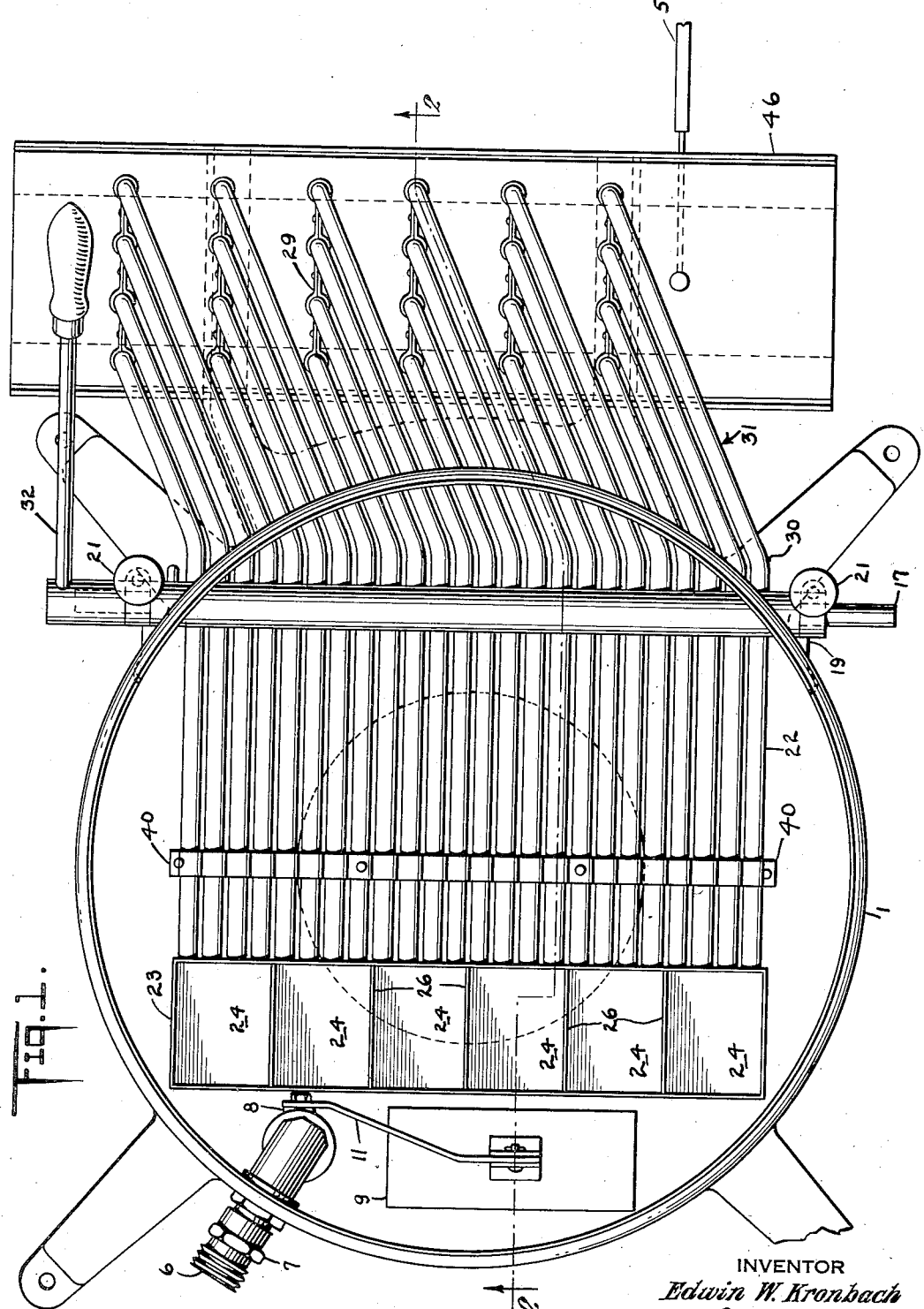
Fig. 1 is a top plan view of a liquid filling and measuring apparatus embodying the invention.

Referring now to the drawings, a tank 1 adapted to contain a supply of liquid, is shown supported upon an angle iron frame base 2, which rests upon legs or standards 3, suitably braced as at 4 intermediate their ends. The tank 1 is provided with a cover 5 to protect the liquid in the tank from dust and the like. A supply pipe 6, for conveying liquid from a source of supply to the tank 1, is preferably coupled as at 7 to the sidewall of the tank and adjacent the upper edge thereof. A float control valve 8, of conventional construction, controls the flow of liquid into the tank, thereby automatically maintaining a proper liquid level at all times. The controlling float 9 is coupled to the valve 8 by a float rod 11, as best shown in Fig. 1. An outlet pipe 12 extends through the bottom of the tank 1, and is provided with a conventional manually operated valve 13, having a handle lever 14, for draining the liquid from the tank when desired, as for instance, for the purpose of cleaning the inside of the tank.

The forward wall of the tank 1, adjacent the upper edge and above the liquid level, is cut away as at 16 to accommodate a rocker shaft 17, extending transversely of the tank. The ends of the shaft 17 are journaled in bearings mounted in brackets 19, secured to the exterior of the tank adjacent the opening 16. The shaft 17 is clampingly mounted in the brackets, and can be removed by loosening the thumb-screws 21 which permits the upper half of the bracket and the bearing to be withdrawn, thereby enabling the shaft 17 to be lifted out of the apparatus.

Mounted on the rocker arm or shaft 17 are a plurality of parallel tubes 22, connected at their inner or receiving ends (which comprise those portions of the tubes between the dipper and the rocker shaft) in communicating relation with a dipper 23, having a plurality of sections 24 formed by division plates 26. While it is not essential to divide the common dipper into sections to secure an equal division of the liquid, a sectional dipper does, however, tend to minimize any inaccuracies in division of the liquid should the apparatus not be absolutely level. The discharging ends of said tubes (which comprise those portions of the tubes between the rocker shaft and the delivery spouts are bent obliquely from the longitudinal axis of their receiving ends, as indicated at 30, so that the delivery spouts 28 (which include the entire ends of the tubes that are bent downwardly at an angle of approximately ninety degrees to the longitudinal axis of the tubes) of each group of tubes are arranged one in advance of the other and in rows corresponding to the rows of the receptacles to be filled. It will be apparent that any number of tubes may be included in each group, depending upon the number of rows of receptacles desired to be filled simultaneously. The delivery spouts 28 of each group are maintained in proper alignment by means of a clamping member 29. The tubes 22 are also bent slightly downwardly, as indicated at 30, at a uniform distance beyond the tilting structure, thereby providing a declined portion 31, as best shown in Fig. 4, wherein the numeral 35 indicates the angle of declination. This declining portion 31 will cause a gravitational discharge of any liquid flowing through the tubes 22 as it reaches the low point 30, regardless of the length of the tube, thereby preventing a greater head of liquid forming in the longer tubes due to pressure of the liquid at the head of the tube or in the dipper 23 while the tubes are being tilted and approach discharging position.

It will be apparent that when the rocker shaft 17 is tilted in one direction by the handle 32, the dipper 23 will be submerged in the liquid of the tank 1, and that as the shaft 17 is tilted or rocked in the opposite direction, the dipper 23 with its liquid contents will be raised above the liquid level of the tank, and upon further forward rocking of the shaft 17, the liquid contents of the dipper will flow through the tubes 22 and be discharged into receptacles through the spouts 28. It will likewise be apparent that as the dipper 23 is being raised, and as it approaches its horizontal plane, charged with liquid, the pressure of the liquid head in the dipper will force a portion of the liquid into the tubes 22. If the tubes 22 are of different lengths, more liquid will flow into the longer tubes than into the shorter tubes, due to the increased space in the tubes, without discharging any liquid into the receptacles. After the receiving ends of the tubes 22 have been raised to their discharging position, each tube will receive equal quantities of liquid, since the dipper is set on a true horizontal plane, the cross-sectional area of the tubes is uniform, and they are mounted in the same plane at their junction with the dipper, thereby assuring the same liquid pressure on each tube. However, with a portion 31 of the tubes being declined as indicated at 30, from a common point equal distance from the dipper 23, the declination will cause a discharge of the liquid flowing through the tubes from the common point 30, and the longer tubes cannot receive more liquid than the shorter tubes prior to the time actual discharging begins.

Figure 2:
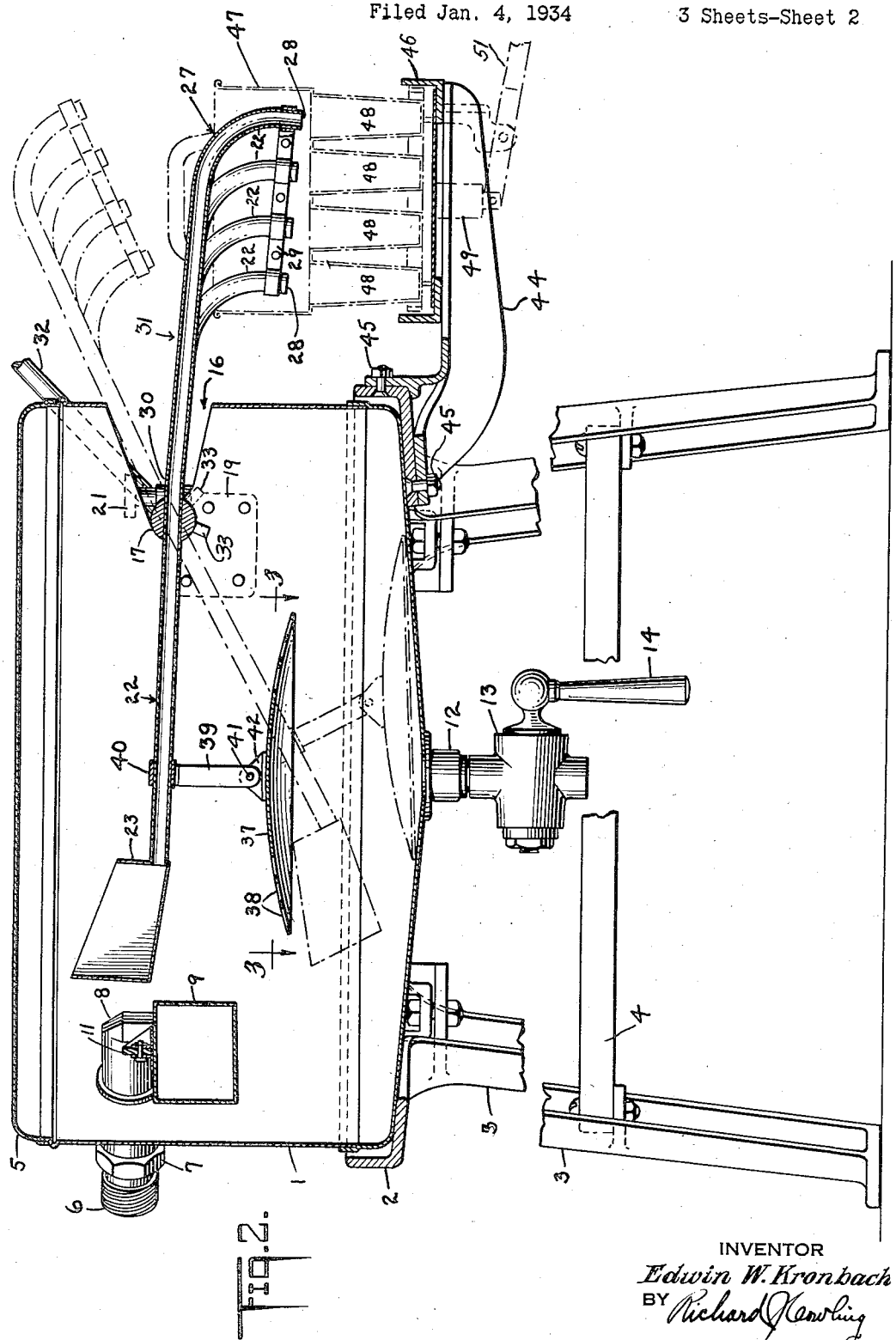
Fig. 2 is a cross-sectional view of the apparatus shown in Fig. 1, the same being taken substantially along the line 2—2 thereof.

As indicated in Fig. 2, the inner or receiving ends of the tubes 22 are submerged in the liquid in the tank 1 when the dipper is lowered to receive a charge of liquid. Thus, means must be provided for preventing this liquid on the outside of the tubes 22 from escaping beyond the rocker shaft 17 and soiling the outside of the machine or the discharging ends of the tubes. This means consists of a longitudinally extending flange 33 mounted on the underside of the shaft 17, as best shown in Fig. 2.

An agitator comprising a disc 37 of conical shape, having apertures 38 arranged therein in spaced relation, is pivotally suspended centrally of the tank 1 from an arm 39 secured to the tubes 22 intermediate the dipper 23 and the rocker shaft 17 by a bracket 40. The disc 37 is pivotally suspended from the lower ends of the arm 39 by a pin 41 journaled in brackets 42 riveted to the disc as indicated at 43. When the rocker shaft 17 and the tubes 22, which are mounted thereon, are tilted, the disc 37 is caused to move vertically through the liquid in the tank, thereby agitating the liquid therein to maintain the solid matter, if any, in suspension. While a perforated conical disc is not essential to provide proper agitation of the liquid in the tank, it has been found that such a disc provides greater agitation and is, therefore, preferable.

Mounted on the forward wall of the tank 1, and directly below the cut-away portion as indicated at 16, is a bracket 44, secured to the bottom and forward exterior of the tank by bolts 45. The bracket 44 supports a track 46 adapted to receive a mold 47, having a plurality of pendant cavities or receptacles 48. The track 46 is provided with a stop 49 adapted to prevent forward movement of molds as they are slid along the track, thereby causing the forward mold to be centered directly beneath the delivery spouts 28. Means for manually withdrawing the stop 49 from the track 46 is provided in the form of a lever 51, thereby permitting the molds 47 to be moved along the track after they have been filled with liquid from the tank.

Although I have only described in detail one form which my invention may assume, it will be apparent to those skilled in the art that the invention is not so limited, but that various modifications may be made therein without departing from the spirit thereof or from the scope of the appended claims.

What I claim is:

1. In a machine of the class described, a tank for containing a quantity of liquid, a tilting structure, a plurality of parallel tubes for conveying liquid from the tank to a plurality of receptacles spaced at varying distances therefrom, said tubes being declined along a transverse axis intermediate their ends.

2. In a machine of the class described, a tank for containing a quantity of liquid, a tilting structure, a plurality of tubes mounted intermediate their ends on said tilting structure, the receiving ends of said tubes having a dipper mounted in communicating relation therewith and the discharging ends of said tubes being of varying lengths and being declined with respect to the receiving ends at a uniform distance from the tilting axis.

3. In a machine of the class described, a tank for containing a quantity of liquid, a tilting structure mounted thereon and above the liquid level therein, a plurality of parallel tubes mounted intermediate their ends on said tilting structure, the receiving ends of said tubes having a dipper mounted in communicating relation therewith and adapted to be submerged and withdrawn from the liquid in said tank, the discharging ends of said tubes being provided with delivery spouts at the extreme outer ends thereof and being of varying lengths and declined with respect to the receiving ends along a transverse axis intermediate the tilting structure and the delivery spouts of said tubes.

4. Apparatus for delivering measured quantities of liquid simultaneously to a plurality of receptacles spaced at varying distances therefrom, including a supply tank, a plurality of parallel tubes for conveying the liquid from the tank to the receptacles, said tubes being fixed with respect to each other and mounted to tilt about a common axis, the receiving ends of said tubes being of equal length and extending in one plane, the discharging ends of said tubes being of unequal length and extending in another plane declined along a common axis to the plane of the receiving ends, and delivery spouts extending downwardly from the discharging ends of said tubes.

5. Apparatus for delivering measured quantities of liquid simultaneously to a plurality of receptacles spaced at varying distances therefrom, including a supply tank, a plurality of parallel tubes for conveying the liquid from the tank to the receptacles, said tubes being fixed with respect to each other and mounted to tilt about a common axis, the receiving ends of said tubes being of equal length and extending in one plane and the discharging ends of said tubes being of unequal lengths and extending in another plane declined to the plane of the receiving ends, the point of declination for each tube being along a common transverse axis.

6. In a machine of the class described, a tank for containing a quantity of liquid, a tilting structure, means operated by said tilting structure for agitating the liquid in said tank, a plurality of tubes mounted intermediate their ends on said tilting structure, the receiving ends of said tubes having a dipper mounted in communicating relation therewith, and the discharging ends of said tubes being of varying lengths and being declined with respect to the receiving ends at a uniform distance from the tilting axis.

7. In a machine of the class described, a tank for containing a quantity of liquid, a tilting structure mounted thereon and above the liquid level therein, means operated by said tilting structure for agitating the liquid in said tank, a plurality of parallel tubes mounted intermediate their ends on said tilting structure, the receiving ends of said tubes having a dipper mounted in communicating relation therewith and adapted to be submerged and withdrawn from the liquid in said tank, the discharging ends of said tubes being provided with delivery spouts at the extreme outer ends thereof and being of varying lengths and declining outwardly with respect to said receiving ends along a common transverse axis intermediate the tilting structure and the delivery spouts of said tubes.

8. Apparatus for delivering measured quantities of liquid simultaneously to a plurality of receptacles spaced at varying distances therefrom, including a supply tank, a plurality of parallel tubes for conveying the liquid from the tank to the receptacles, said tubes being fixed with respect to each other and mounted to tilt about a common axis, the receiving ends of said tubes being of equal length and extending in one plane, the discharging ends of said tubes being of unequal length and extending in another plane declined along a common axis to the plane of the receiving ends and delivery spouts extending downwardly from the discharging ends of said tubes, and means suspended from said tubes for agitating the liquid in the tank when tilted about said common tilting axis.

9. Apparatus for delivering measured quantities of liquid simultaneously to a plurality of receptacles spaced at varying distances therefrom, including a supply tank, a plurality of parallel tubes for conveying the liquid from the tank to the receptacles, said tubes being fixed with respect to each other and mounted to tilt about a common axis, the receiving ends of said tubes being of equal length and extending in one plane and the discharging ends of said tubes being of unequal lengths and extending in another plane declined to the plane of the receiving ends, the point of declination for each tube being along a common transverse axis, said tubes having means suspended therefrom for agitating the liquid in the tank when tilted about said common tilting axis.

10. Apparatus for delivering measured quantities of liquid simultaneously from a supply tank to a plurality of rows of receptacles spaced at varying distances therefrom, including a plurality of parallel conveying tubes mounted to tilt about a common axis, said tubes having their receiving ends extending inwardly at right angles from said axis and their discharging ends extending at an angle oblique to said axis, the discharging ends of said tubes being declined with respect to said receiving ends at a uniform distance from said axis.

11. Apparatus for delivering measured quantities of liquid simultaneously from a supply tank to a plurality of rows of receptacles spaced at varying distances therefrom, including a plurality of parallel conveying tubes mounted to rock about a common axis, said tubes having their receiving ends extending inwardly at right angles to said axis and having a dipper mounted in communicating relation therewith and the discharging ends of said tubes extending at varying lengths outwardly from said axis being bent at an angle oblique to the longitudinal axis of said receiving ends to provide delivery spouts arranged one in advance of the other, said discharging ends of said tubes being declined with respect to said receiving ends along a common transverse axis intermediate the rocking axis and the delivery spouts, thereby insuring simultaneous discharge of liquid from the tubes notwithstanding their varying lengths.

12. Apparatus for delivering measured quantities of liquid simultaneously to a plurality of receptacles, including a supply tank, a plurality of parallel tubes for conveying the liquid, said tubes being fixed with respect to each other and mounted to tilt about a common axis, said tubes having their discharging ends extending outwardly at varying distances from the tank and being declined with respect to their receiving ends at a uniform distance from said axis.

13. Apparatus for delivering measured quantities of liquid simultaneously to a plurality of receptacles, including a supply tank, a plurality of parallel tubes for delivering the liquid, said tubes being fixed with respect to each other and mounted to tilt about a common axis, said tubes having their receiving ends mounted in a dipper and their discharging ends being provided with delivery spouts extending at varying distances therefrom, the discharging ends of said tubes being declined with respect to their receiving ends at a uniform distance from the dipper.

14. As a new element in a liquid measuring and filling machine including a tank for containing a quantity of liquid, a dipping and pouring unit rockably mounted in operative relation with said tank, said unit having means including a disc concaved downwardly for agitating the liquid in the tank.

15. As a new element in a liquid measuring and filling machine including a tank for containing a quantity of liquid, a dipping and pouring unit tiltably mounted in operative relation with said tank, said unit having means including a disc concaved downwardly having apertures therein for agitating the liquid in the tank.

EDWIN W. KRONBACH.